Patented July 8, 1924.

1,500,126

UNITED STATES PATENT OFFICE.

HUGO H. HANSON AND JOHN T. LEECOCK, OF BANGOR, AND CHARLES A. BLODGETT, OF BREWER, MAINE, ASSIGNORS TO EASTERN MANUFACTURING COMPANY, OF BOSTON, MASSACHUSETTS, A CORPORATION OF MASSACHUSETTS.

PROCESS OF PURIFYING BRINE FOR ELECTROLYSIS.

No Drawing. Application filed October 9, 1919. Serial No. 329,424.

*To all whom it may concern:*

Be it known that we, HUGO H. HANSON, JOHN T. LEECOCK, and CHARLES A. BLODGETT, citizens of the United States, residing respectively, at Bangor, Bangor, and Brewer, in the county of Penobscot and State of Maine, have invented new and useful Improvements in Processes of Purifying Brine for Electrolysis, of which the following is a specification.

In the electrolytic cells commonly used in this art, the aqueous sodium chloride solution is continuously delivered to the cell, is there electrolyzed, the products of electrolysis being separated from each other by a porous diaphragm, and the effluent solution containing the caustic soda is drawn off and submitted to a subsequent treatment to recover the salt and the caustic soda.

The solution, which is drawn off from the compartment containing the cathode, contains sodium hydroxide, together with residual sodium chloride which has not undergone electrolysis, and some minor impurities. It is passed to a heated concentrator in which evaporation causes the less soluble chloride or salt to crystallize out in large degree; the concentrated sodium hydroxide or caustic solution is drawn off; and the salt crystals are afterwards washed several times for the further removal of caustic, so that the salt will be as free as possible of caustic.

After this washing, the salt with a very little adventitious residual adherent caustic, and some minor impurities, is re-dissolved along with fresh salt in a dissolving tank or "saturator" for return to the cells. This fresh salt practically always contains some calcium and magnesium chloride as impurities, and the mixed solution requires treatment for removal of impurities and particularly of those just named. It is toward the improvement of this treatment that our invention is specifically directed.

In the art as now practiced, this purifying treatment is as follows:

First: The calcium, which exists as a chloride in the solution consisting of the reclaimed salt and the fresh salt, is precipitated by addition of a slight excess of sodium carbonate, which causes precipitation of calcium carbonate and formation of sodium chloride in accordance with the reaction,

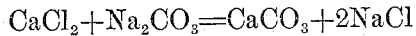
$$CaCl_2 + Na_2CO_3 = CaCO_3 + 2NaCl$$

Magnesium is concurrently precipitated by addition of caustic soda, which, together with that adventitiously remaining in the reclaimed brine, produces a slight excess. The magnesium hydroxide is precipitated in accordance with the reaction:

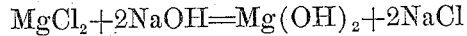
$$MgCl_2 + 2NaOH = Mg(OH)_2 + 2NaCl$$

A slight excess of the carbonate and the hydroxide is necessary to insure complete precipitation of the calcium and magnesium salts.

Second: Both the magnesium hydroxide and the calcium carbonate are filtered out by passing the solution through a suitable filter and delivering to an acidifying tank.

Third: The excess of caustic soda and sodium carbonate are somewhat over-neutralized in this acidifying tank by addition of hydrochloric acid.

The brine is then in condition to be passed to the cells, since the major impurities have been removed. The most important impurity usually remaining is iron in the reduced or ferrous condition.

In accordance with our invention, a different procedure or process is followed, by which we secure certain benefits, such as precipitation of the iron, and economy in cost of reagents, without compensating disadvantages. This procedure is as follows:

First: In washing the salt crystals after drawing off the caustic soda liquor from the cathode compartment of the cells, a less complete removal of caustic than usual is practiced, thereby ensuring a salt solution containing not less than a predetermined quantity of caustic soda. The reclaimed brine made by redissolving this salt is thus more alkaline than is usual.

Second: When this reclaimed brine is mixed with fresh brine, there is immediate precipitation of the magnesium in the latter by the excess of sodium hydroxide in the former, the reaction being as before.

Third: Carbon dioxide gas is passed into the mixed brines. This combines directly with the remaining sodium hydroxide, forming sodium carbonate, which in turn reacts with the calcium chloride, precipitating calcium carbonate. The carbon dioxide may be derived from flue gases by means further explained in a later paragraph. The solution is now filtered as before.

Fourth: The filtered solution is neutralized by means of chlorine instead of hydrochloric acid. The chlorine combines with sodium carbonate, forming sodium hypochlorite and sodium chloride, and liberating carbon dioxide, the reaction being as follows:

$$Na_2CO_3 + Cl_2 = NaOCl + NaCl + CO_2$$

A further action of the chlorine in the acidulating tank is the precipitation of the iron, which is oxidized by the chlorine from the ferrous to the far less soluble ferric state, and is afterward filtered out before the brine is sent to the electrolytic cells. There is no such action where hydrochloric acid is used for acidulation, as has been done heretofore, and the brine in that case goes to the cells contaminated with whatever iron it originally contained.

The several advantages distinguishing our improved process from that now standard, are as follows:

In the washing of the salt crystals, the last stages are omitted so as to leave the desired alkalinity. These last wash waters in standard practice bring off but a small amount of the desired caustic soda, and a rather large amount of salt, which is not desired. Their omission thus leaves the caustic solution more concentrated and less contaminated than in standard practice. The use of residual caustic combined with carbon dioxide, in place of soda ash, for precipitation of calcium would entail added expense if both materials were figured at market prices, but the true cost of the residual caustic in solution at this point in the process is materially less than the purchase price of the equivalent soda ash, and there is thus a saving in cost of reagents.

The use of chlorine for acidulation in place of hydrochloric acid has two advantages: First, it saves in cost of reagents, and, second, the oxidizing action of the chlorine changes such soluble ferrous iron salts as are present to the insoluble ferric form, and causes their precipitation in the acidulating tank, thus leading to their removal by filtration. These iron salts, if left in solution, as is customary, are precipitated by oxidation in the cell, and progressively clog the diaphragm, both shortening its life and reducing the average rate of flow of solution through it, and consequently the productivity of the cell. The production of sodium hypochlorite along with the sodium chloride where chlorine is used, is disadvantageous in so far as it wastes chlorine, but the loss is small compared with the afore-mentioned gains. The presence of this sodium hypochlorite is not objectionable, since in normal operation there is always a certain amount present in the electrolytic cell, on account of solution of chlorine formed at the anodes and its reaction with caustic ions migrating back from the cathode through the diaphragm at a rate higher than the opposite flow of electrolyte, but in our case, since we secure an unusually high average rate of flow in the cell due to absence of iron on the diaphragms, the hypochlorite from this source is materally reduced.

Recapitulating, the advantages are: Saving in cost of reagents, and precipitation and removal of iron, with resulting increase in life of diaphragm, and of practicable productive rate of cell.

Certain structural and operating details and precautions will next be considered:

If flue gas be used as a source of carbon dioxide, it is essential that it be washed in some form of gas scrubber effective enough to remove dirt and cinders; and it is desirable that this operation be so performed that the solubility of the carbon dioxide in water shall not result in large loss. High temperature, repeated use of the same scrubbing water, and salting are well known expedients and are sufficiently effective.

Any satisfactory means for bringing the carbon dioxide into solution may be employed such as an apparatus by which the washed flue gases are caused to bubble up in rather finely divided streams through the dissolving tank. The requisite pressure may be obtained from any form of low-pressure compressing apparatus. We have found good results with a high-speed centrifugal blower of the so-called turbine type.

For causing the absorption of the chlorine, economy in power and in maintenance of apparatus are best served, by showering or spraying the alkaline salt solution through a chamber into which chlorine is admitted from the usual pipe system.

Having thus described our invention, what we claim as new and desire to secure by Letters Patent is:

1. The herein described process of purifying a sodium chloride brine, containing a soluble salt of magnesium, for use in electrolytic cells, which comprises the following steps: evaporating and concentrating the mixed sodium chloride and caustic effluent resulting from the electrolytic decomposition of a sodium chloride solution, removing from said effluent the sodium chloride and a proportion of caustic soda in excess of that required to precipitate magnesium hydroxide in said first-mentioned solution, whereby such magnesium hydroxide may be precipitated, and mixing the removed sodium chloride and excess caustic soda with said first-mentioned brine to be purified.

2. The herein described process of purifying a solution of sodium chloride, containing the soluble salts of magnesium, calcium and ferrous iron, for use in electrolytic cells, which comprises the following steps, namely: evaporating and concentrating the mixed sodium chloride and caustic effluent resulting from the electrolytic decomposition of a sodium chloride solution, removing from such effluent the sodium chloride and a proportion of sodium hydroxide in excess of that required to precipitate magnesium hydroxide in said first-mentioned solution, and mixing the same with the said first-mentioned solution whereby the magnesium hydroxide is precipitated; passing carbon dioxide into the solution to react with the excess sodium hydroxide and form sodium carbonate, and by secondary reaction of sodium carbonate with the soluble calcium salts to precipitate calcium carbonate; filtering the brine to remove the precipitated insoluble salts of calcium and magnesium; then causing the remaining brine to absorb chlorine in excess of that necessary to combine with the residual sodium carbonate and sodium hydroxide to cause the oxidation and precipitation of ferrous iron to a ferric salt; finally filtering and then electrolytically decomposing the brine and obtaining a fresh effluent, and repeating the said steps thereby securing a cyclic operation.

In testimony whereof we have affixed our signatures.

HUGO H. HANSON.
JOHN T. LEECOCK.
CHARLES A. BLODGETT.